USO10204246B1

United States Patent
Maguire et al.

(10) Patent No.: US 10,204,246 B1
(45) Date of Patent: *Feb. 12, 2019

(54) RFID TAGS WITH PORT-DEPENDENT FUNCTIONALITY

(71) Applicant: Impinj, Inc., Seattle, WA (US)

(72) Inventors: Yael Maguire, Boston, MA (US); Ronald A. Oliver, Seattle, WA (US); Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/238,823

(22) Filed: Aug. 17, 2016

Related U.S. Application Data

(63) Continuation of application No. 13/651,109, filed on Oct. 12, 2012, now Pat. No. 9,449,265, which is a continuation-in-part of application No. 13/196,877, filed on Aug. 2, 2011, now Pat. No. 9,087,281.

(60) Provisional application No. 61/679,013, filed on Aug. 2, 2012.

(51) Int. Cl.
| | | |
|---|---|---|
| G05B 11/01 | (2006.01) | |
| G08C 19/16 | (2006.01) | |
| G08C 19/02 | (2006.01) | |
| G08C 19/12 | (2006.01) | |
| H03K 17/62 | (2006.01) | |
| H03K 19/018 | (2006.01) | |
| H04Q 5/22 | (2006.01) | |
| G06K 7/10 | (2006.01) | |

(52) U.S. Cl.
CPC ............... *G06K 7/10356* (2013.01)

(58) Field of Classification Search
None
See application file for complete search history.

(56) References Cited

U.S. PATENT DOCUMENTS

| | | | | |
|---|---|---|---|---|
| 5,491,468 A * | 2/1996 | Everett | ............... | G06K 7/0008 340/10.34 |
| 5,572,226 A * | 11/1996 | Tuttle | ................. | G01S 13/758 343/726 |
| 6,138,012 A * | 10/2000 | Krutz | ................ | H04B 7/18513 455/272 |
| 6,560,443 B1 * | 5/2003 | Vaisanen | ................ | H01Q 3/24 455/553.1 |
| 6,946,950 B1 * | 9/2005 | Ueno | ................ | G06K 7/0008 340/10.1 |

(Continued)

OTHER PUBLICATIONS

Final Office Action received for U.S. Appl. No. 12/483,842, dated Oct. 16, 2014 and filed Jun. 12, 2009.

(Continued)

*Primary Examiner* — Steven Lim
*Assistant Examiner* — Muhammad Adnan
(74) *Attorney, Agent, or Firm* — Turk IP Law, LLC

(57) ABSTRACT

An Integrated Circuit (IC) for an RFID tag includes at least two antenna ports for coupling to at least two antennas. The IC may be configured to determine the port from which it receives an input signal, and provide a first functionality if it receives the input from a first port and a second functionality if it receives the input from a second port. The IC may be configured to determine and/or offer a functionality based on the receiving port.

18 Claims, 13 Drawing Sheets

(56) References Cited

U.S. PATENT DOCUMENTS

| | | | | |
|---|---|---|---|---|
| 7,008,456 B1* | 3/2006 | Tanaka | G06F 1/1616 | 726/27 |
| 7,289,810 B2* | 10/2007 | Jagadeesan | H04W 64/00 | 455/439 |
| 7,385,477 B2* | 6/2008 | O'Toole | H03L 7/0995 | 340/10.2 |
| 7,394,878 B2* | 7/2008 | Nysen | H04L 27/1525 | 340/572.1 |
| 7,463,243 B1* | 12/2008 | Kangas | G06F 3/03543 | 345/163 |
| 7,710,273 B2* | 5/2010 | Smith | G06K 7/0008 | 340/10.1 |
| RE41,531 E* | 8/2010 | Wood, Jr. | G06F 13/4027 | 370/329 |
| 8,587,409 B2* | 11/2013 | Lee | G06K 7/01 | 340/10.1 |
| 8,648,698 B2* | 2/2014 | Alicot | G06K 7/0008 | 235/492 |
| 8,674,810 B2* | 3/2014 | Uysal | G06K 7/0008 | 340/10.4 |
| 8,884,764 B2* | 11/2014 | Forster | G06K 19/07372 | 340/572.1 |
| 8,994,508 B2* | 3/2015 | Dacus | G06K 7/0008 | 235/375 |
| 9,741,231 B2* | 8/2017 | Brandi | G06K 19/07372 | |
| 9,763,115 B2* | 9/2017 | Qi | H04W 24/02 | |
| 2001/0050922 A1* | 12/2001 | Tiernay | G08G 1/017 | 370/467 |
| 2002/0145036 A1* | 10/2002 | Otto | G06K 7/0008 | 235/383 |
| 2004/0263319 A1* | 12/2004 | Huomo | G06K 19/0716 | 340/10.2 |
| 2005/0212674 A1* | 9/2005 | Desmons | G06K 19/07749 | 340/572.7 |
| 2006/0164208 A1* | 7/2006 | Schaffzin | G07C 9/00182 | 340/5.64 |
| 2006/0267736 A1* | 11/2006 | Tiernay | G06K 19/0707 | 340/10.51 |
| 2007/0013481 A1* | 1/2007 | Zhu | G06K 19/0705 | 340/10.1 |
| 2007/0040689 A1* | 2/2007 | Reynolds | G01S 13/74 | 340/572.7 |
| 2007/0109103 A1* | 5/2007 | Jedrey | G06Q 10/087 | 340/10.5 |
| 2007/0128760 A1 | 6/2007 | Subramanian et al. | | |
| 2007/0178935 A1* | 8/2007 | Shim | H04W 52/0235 | 455/552.1 |
| 2007/0205896 A1* | 9/2007 | Beber | G06K 7/0008 | 340/572.1 |
| 2007/0222610 A1* | 9/2007 | Tagato | G06K 19/07336 | 340/572.7 |
| 2007/0262851 A1* | 11/2007 | Stewart | G06K 7/0008 | 340/10.1 |
| 2008/0024305 A1* | 1/2008 | Deavours | G06K 19/07749 | 340/572.7 |
| 2008/0080214 A1 | 4/2008 | Umeda et al. | | |
| 2008/0088417 A1* | 4/2008 | Smith | G06K 19/0707 | 340/10.41 |
| 2008/0297318 A1* | 12/2008 | Ohashi | G06K 17/00 | 340/10.1 |
| 2009/0117872 A1* | 5/2009 | Jorgenson | G06K 19/0713 | 455/334 |
| 2009/0237223 A1* | 9/2009 | Zimmerman | G06K 19/0707 | 340/10.41 |
| 2009/0284354 A1* | 11/2009 | Pinkham | G06K 7/0008 | 340/10.3 |
| 2010/0148965 A1* | 6/2010 | Alexis | G06K 19/0723 | 340/572.1 |
| 2010/0182023 A1* | 7/2010 | Pena | G01N 17/04 | 324/700 |
| 2011/0068987 A1* | 3/2011 | Carr | H01Q 1/2225 | 343/741 |
| 2011/0199186 A1* | 8/2011 | Han | G06K 19/07741 | 340/10.1 |
| 2011/0268050 A1* | 11/2011 | Farajidana | H04L 5/0051 | 370/329 |
| 2012/0019363 A1* | 1/2012 | Fein | G06K 19/072 | 340/10.1 |
| 2012/0234058 A1* | 9/2012 | Neil | G07C 9/00571 | 70/91 |
| 2012/0269140 A1* | 10/2012 | Nam | H04B 7/024 | 370/329 |
| 2012/0286927 A1* | 11/2012 | Hagl | G07C 9/00309 | 340/5.61 |

OTHER PUBLICATIONS

Final Office Action received for U.S. Appl. No. 13/196,877, dated Jul. 7, 2014 and filed Aug. 2, 2011.
Non-Final Office Action for U.S. Appl. No. 13/196,877, filed Aug. 2, 2011, dated Nov. 8, 2013.

* cited by examiner

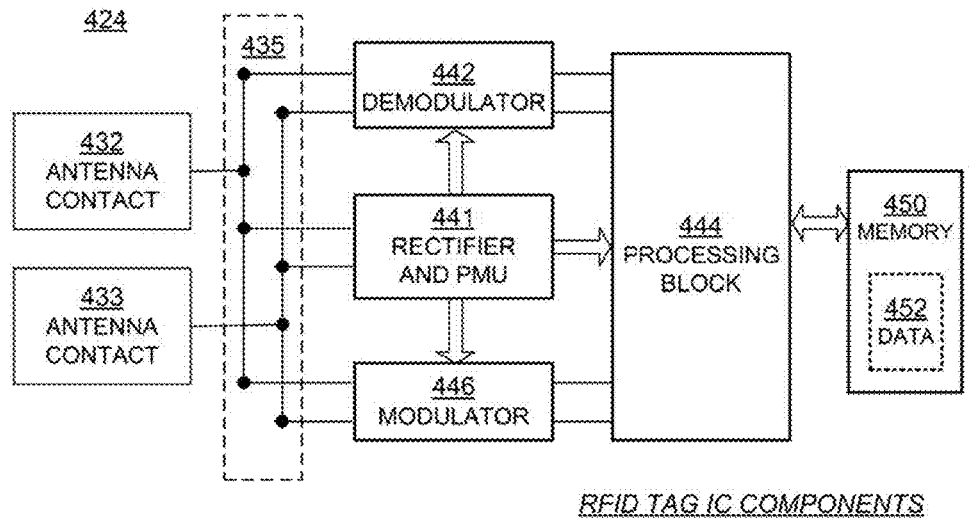
FIG. 4
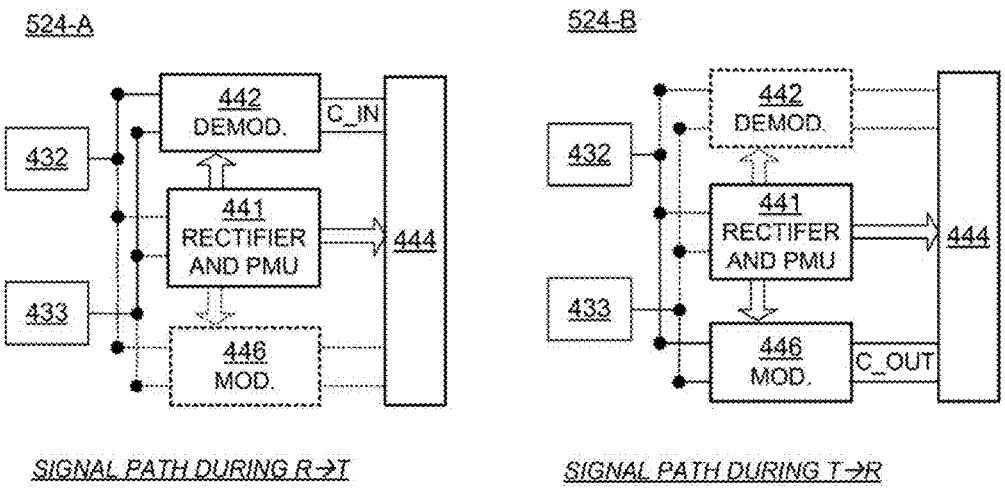
FIG. 5A  FIG. 5B

RFID TAGS WITH PORT-DEPENDENT FUNCTIONALITY

CROSS-REFERENCE TO RELATED APPLICATIONS

This application is a continuation of U.S. patent application Ser. No. 13/651,109 filed on Oct. 12, 2012, which claims priority from U.S. Provisional Appl. Ser. No. 61/679,013 filed on Aug. 2, 2012 and is a continuation-in-part (CIP) of U.S. patent application Ser. No. 13/196,877 filed on Aug. 2, 2011. The cited applications are hereby incorporated by reference in their entirety.

BACKGROUND

Radio-Frequency Identification (RFID) systems typically include RFID readers, also known as RFID reader/writers or RFID interrogators, and RFID tags. RFID systems can be used to inventory, locate, identify, authenticate, configure, enable/disable, and monitor items to which the tags are attached or in which the tags are embedded. RFID systems may be used in retail applications to inventory and track items; in consumer- and industrial-electronics applications to configure and monitor items; in security applications to prevent item loss or theft; in anticounterfeiting applications to ensure item authenticity; and in myriad other applications.

RFID systems operate by an RFID reader interrogating one or more tags using a Radio Frequency (RF) signal. The RF signal is typically electromagnetic, at least in the far field. The RF signal can also be predominantly electric or magnetic in the near field. The RF signal may encode one or more commands that instruct the tags to perform one or more actions.

A tag that senses the interrogating RF signal may reply with a responding RF signal (a response). The responding RF signal may be generated by the tag, or it may be formed by the tag reflecting back a portion of the interrogating RF signal in a process known as backscatter. Backscatter may take place in a number of ways.

The reader receives, demodulates, and decodes the response. The decoded response may include data stored in the tag such as a serial number, price, date, time, destination, encrypted message, electronic signature, other attribute(s), any combination of attributes, or any other suitable data. The decoded response may also encode status information about the tag, the item to which the tag is attached, or the item into which the tag is embedded such as a tag status message, item status message, configuration data, or any other status information.

An RFID tag typically includes an antenna and an RFID integrated circuit (IC) comprising a radio section, a power management section, and frequently a logical section, a memory, or both. In some RFID ICs the logical section includes a cryptographic algorithm which may rely on one or more passwords or keys stored in tag memory. In earlier RFID tags the power management section often used an energy storage device such as a battery. RFID tags with an energy storage device are known as battery-assisted, semi-active, or active tags. Advances in semiconductor technology have miniaturized the IC electronics so that an RFID tag can be powered solely by the RF signal it receives. Such RFID tags do not include a long-term energy-storage device and are called passive tags. Of course, even passive tags typically include temporary energy- and data/flag-storage elements such as capacitors or inductors.

BRIEF SUMMARY

This summary introduces a selection of concepts in a simplified form that are further described below in the Detailed Description. This summary is not intended to identify key features or essential features of the claimed subject matter, nor is it intended as an aid in determining the scope of the claimed subject matter.

As described above, RFID systems operate by exchanging RF signals that encode information. RFID systems may be configured to operate in different frequency ranges (as described in above-referenced U.S. patent application Ser. No. 13/196,877), at different distances, with different protocols, and in different applications. In some situations, it may be desirable to have a single RFID tag capable of operating in multiple frequency ranges, using multiple protocols, at multiple distances, and/or in multiple applications. In addition, it may be useful for a tag to behave differently based on its received signal. For example, it may be desirable for a tag to exhibit a first behavior (reply with a first code or permit a first functionality) upon receiving a signal in a first frequency range or at a first distance, and to exhibit a second, different behavior (reply with a second code or permit a second functionality) upon receiving a signal in a second frequency range or at a second distance. Such a tag is more versatile than one configured to operate in a single frequency range or behave similarly regardless of its received signal. However, many RFID ICs electrically couple to a single antenna, and because antennas usually operate over a prescribed range of frequencies or distances, an IC that couples to a single antenna may not be capable of adequately operating in multiple frequencies ranges, at different distances, or sometimes even with different protocols.

Embodiments herein describe ICs for RFID tags, and RFID tags including such ICs, where the ICs are designed to electrically couple to multiple antennas, each via an antenna port. Each antenna port may be electrically isolated from the other antenna ports, and the IC may behave differently based on the particular antenna port it receives an RF signal on.

Embodiments are directed to an IC for an RFID tag, and an RFID tag including such an IC, where the IC includes at least two antenna ports for connecting to at least two antennas, with the antenna ports optionally electrically isolated from each other. The IC is configured to determine the antenna port from which it receives an input and provide a first functionality if it receives the input from a first antenna port and a second functionality if it receives the input from a second antenna port.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying Drawings, in which:

FIG. 4 is a block diagram showing a detail of an RFID tag IC, such as the one shown in FIG. 2.

FIGS. 5A and 5B illustrate signal paths during tag-to-reader and reader-to-tag communications in the block diagram of FIG. 4.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
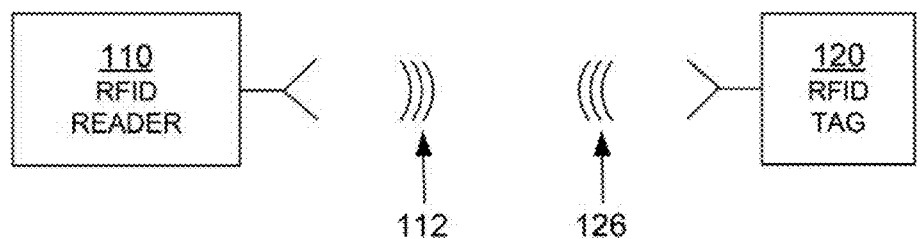
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals)

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
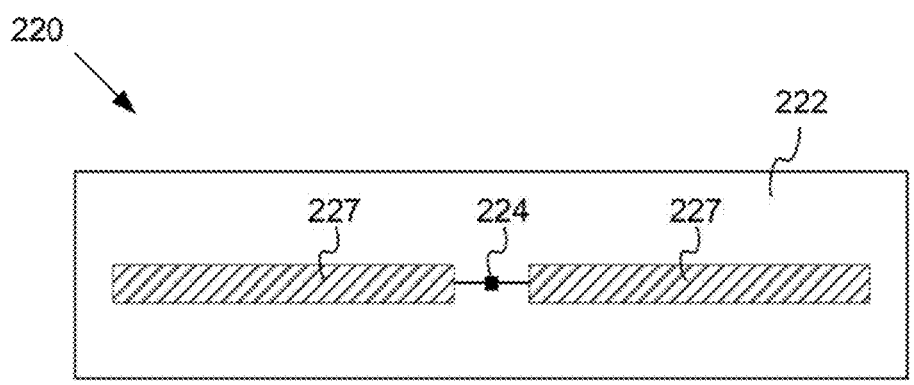
FIG. 2 is a diagram showing components of a passive RFID tag, such as a tag that can be used in the system of FIG. 1.

FIG. 2 is a diagram of an RFID tag 220, which may function as tag 120 of FIG. 1. Tag 220 is a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which is preferably implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable antenna contacts (not shown in FIG. 2).

IC 224 is shown with a single antenna port, comprising two antenna contacts electrically coupled to two antenna segments 227 which are shown here forming a dipole. Many other embodiments are possible using any number of ports, contacts, antennas, and/or antenna segments.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the antenna contacts of IC 224 can modulate the antenna's reflectance, as can varying the admittance of a shunt-connected circuit element which is coupled to the antenna contacts. Varying the impedance of a series-connected circuit element is another means of modulating the antenna's reflectance.

In the embodiment of FIG. 2, antenna segments 227 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, or any other suitable antenna.

The components of the RFID system of FIG. 1 may communicate with each other in any number of modes. One such mode is called full duplex. Another such mode is called half-duplex, and is described below.

Figure 3:
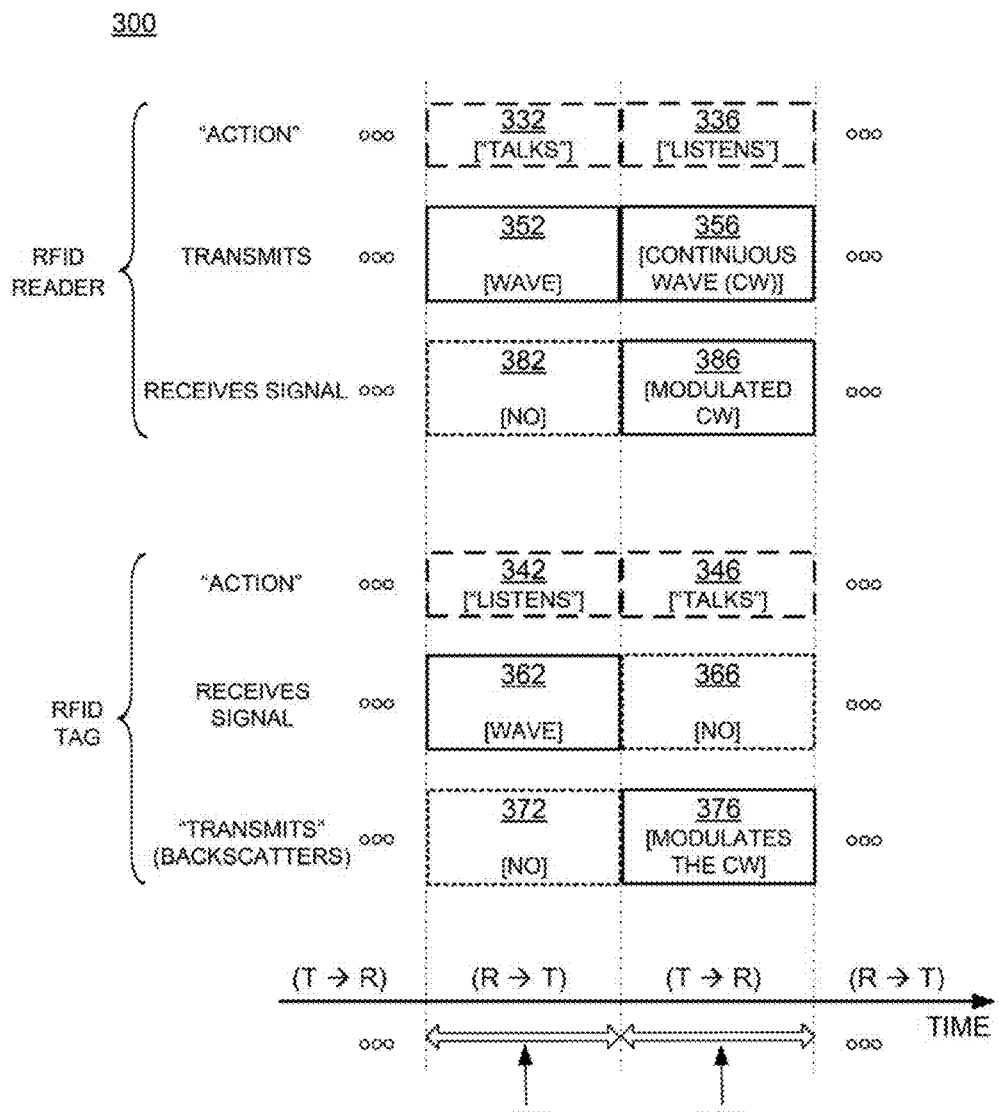
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two antenna contacts 432, 433, suitable for coupling to antenna segments such as segments 227 of RFID tag 220 of FIG. 2. When two antenna contacts form the signal input from and signal return to an antenna they are often referred-to as an antenna port. Antenna contacts 432, 433 may be made in any suitable way, such as from metallic pads and so on. In some embodiments circuit 424 uses more than two antenna contacts, especially when tag 220 has more than one antenna port and/or more than one antenna.

Circuit 424 also includes signal-routing section 435 which may include signal wiring, a receive/transmit switch that can selectively route a signal, and so on.

Circuit 424 also includes a rectifier and PMU (Power Management Unit) 441 that harvests energy from the RF signal received by antenna 227 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via antenna contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving antenna contacts 432, 433, and therefore driving the load presented by the coupled antenna segment or segments. The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session during time interval 312 of FIG. 3. Demodulator 442 demodulates an RF signal received from antenna contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 227 of RFID tag 220 via antenna contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as Version 1.2.0 of the Class-1 Generation-2 UHF RFID Protocol for Communications at 860 MHz-960 MHz ("Gen2 Specification") by EPCglobal, Inc., which is hereby incorporated by reference in its entirety. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications.

Figure 6A:
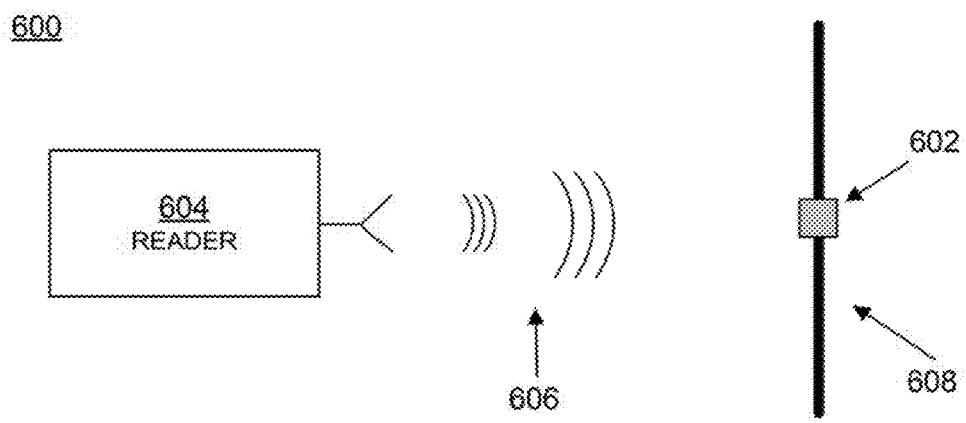
FIGS. 6A and 6B depict RFID systems with single-port RFID tags and configured to respond to far-field and near-field signals, respectively.

Some RFID systems may be configured to operate, and in some cases permit or prevent operations, based on the distance between a tag and a reader. For example, an RFID system for inventorying RFID-tagged items in a warehouse typically operates at long distance. In these situations it is desirable to have RFID tags and readers configured with far-field antennas to enable efficient coupling using relatively long-range RF signals. FIG. 6A depicts an RFID system 600 with an RFID IC 602 coupled to a far-field antenna 608 configured to detect and respond to long-range signals 606 transmitted by a reader 604.

Other RFID systems may be configured to operate at short distances. Short-distance interactions may be desirable for private or sensitive transactions, such as when transferring confidential information or for secure financial transactions (e.g., wireless payment). Short-distance interactions may also be used to only permit operations, such as access at a secured entry point, to nearby tags. In these situations it is desirable to have RFID tags and readers configured with near-field antennas to enable efficient coupling with relatively short-range RF waves and/or non-propagating RF signals. FIG. 6I depicts an RFID system 650 with an RFID IC 652 coupled to a near-field antenna 658 configured to detect and respond to short-range signals 656 transmitted by a reader 654.

Figure 6B:
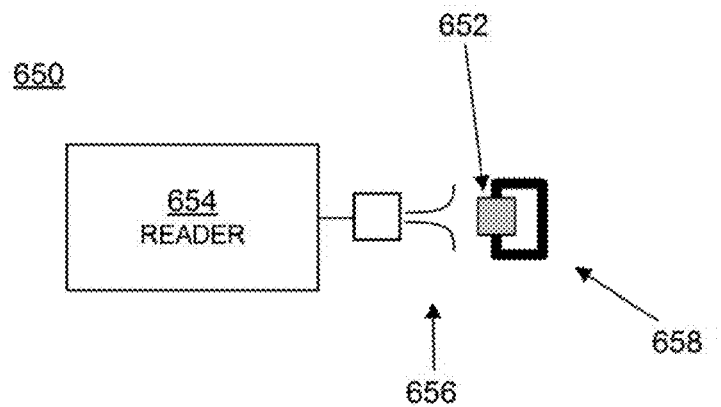

In some embodiments, it is desirable to have a single tag or tag IC that is capable of detecting and responding to both far-field and near-field communications. However, a single-port IC (such as the ones shown in FIGS. 6A-B) typically connects to only one antenna, and an antenna configured to operate in the far-field may not couple well with near-field signals (and vice versa). Of course, it is possible to construct an antenna that can respond to both far-field and near-field signals, but typical engineering tradeoffs generally degrade the antenna in some other way, such as reduced efficiency, larger size, higher cost, higher complexity, and so on. Furthermore, a single-port antenna configured to respond to both far-field and near-field signals, when coupled with a single-port IC, does not give the tag IC a simple way to discriminate whether a received signal is far-field or near-field, limiting or eliminating the IC's ability to provide distance-dependent functionality.

Figure 7:
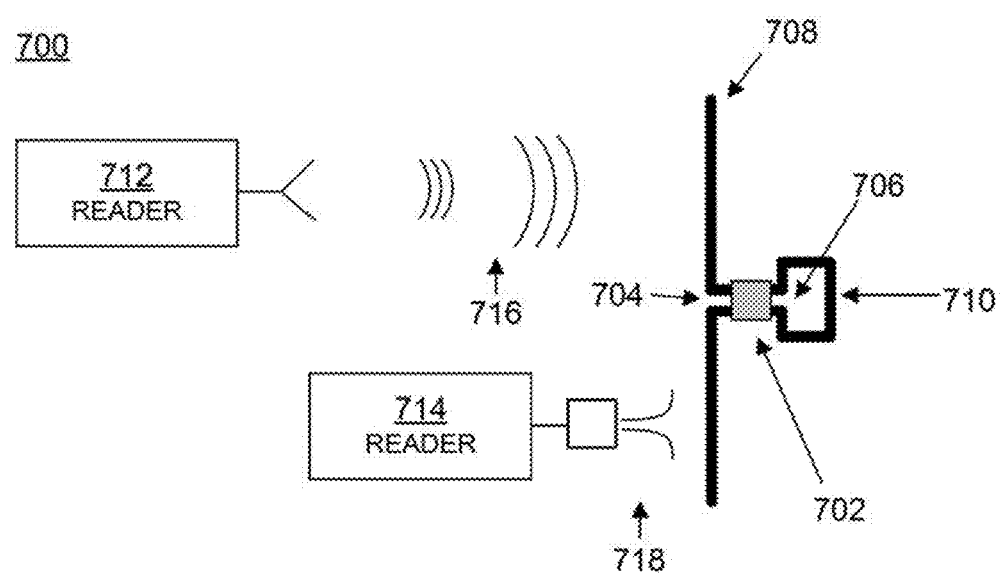
FIG. 7 depicts an RFID system having a dual-port RFID tag configured to respond to both far-field and near-field signals.

FIG. 7 depicts an RFID system 700 with a dual-port IC 702 configured to respond to both far-field and near-field signals. IC 702 is configured with two antenna ports 704 and 706, one (704) connected to a far-field antenna 708 and the other (706) connected to a near-field antenna 710. When reader 712 sends a far-field signal 716, IC 702 may detect it and respond via port 704 and antenna 708. When reader 714 sends a near-field signal 718, IC 702 may detect it and respond via port 706 and antenna 710.

In some embodiments, IC 702 may be configured to detect and respond to far-field and near-field signals independently. For example, IC 702 may be able to receive and process a far-field signal via port 704 and far-field antenna 708, while at substantially the same time receiving and processing a near-field signal via port 706 and near-field antenna 710. IC 702 may also respond differently depending on the port an incoming signal is received on. For example, IC 702 may provide a first functionality upon receiving a signal via port 704, and a second functionality different from the first upon receiving a signal via port 706.

Figure 8:
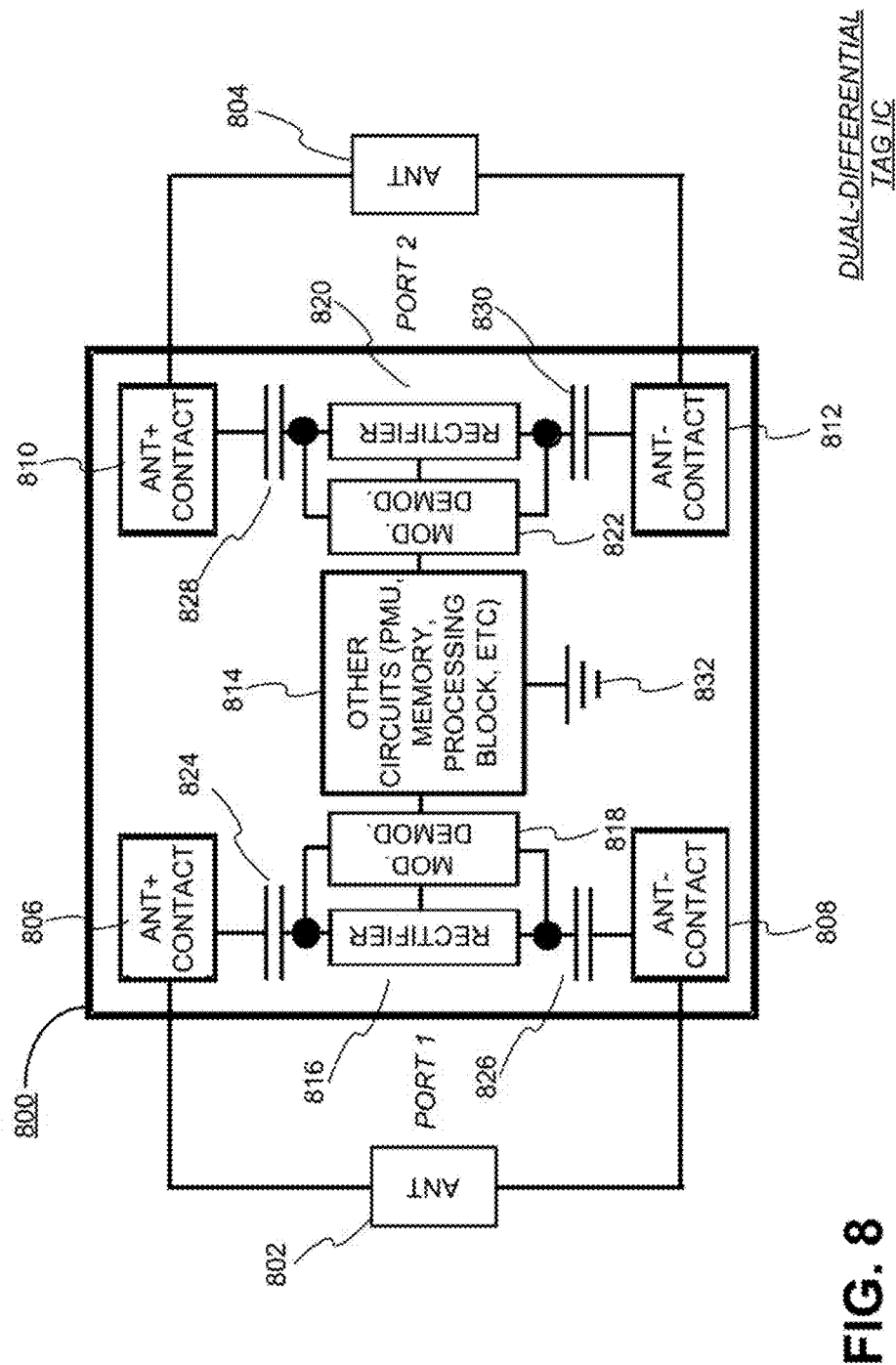
FIG. 8 illustrates a dual-differential RFID tag IC with electrically isolated antenna ports according to embodiments.

To support port-dependent functionality, in some embodiments an RFID IC may have two or more antenna ports that are differential and/or electrically isolated from each other. FIG. 8 illustrates such a tag IC 800, termed "dual-differential" because it has dual antenna ports, each of which accepts a differential input. The ports are "electrically isolated" because an odd-mode excitation on one port results in substantially no odd-mode coupling to the other port. IC 800 includes antenna contacts 806 and 808 (comprising port 1) coupled to antenna 802, and antenna contacts 810 and 812 (comprising port 2) coupled to antenna 804. All four antenna contacts (806, 808, 810, and 812) couple to rectifiers through capacitors 824, 826, 828, and 830, and none are directly coupled to each other or to IC reference potential 832. Although capacitors 824, 826, 828, and 830 are optional, they facilitate electrical isolation between the ports by allowing the antenna contacts to develop DC potentials that are different from the rectifier input potentials. The ports remain electrically isolated when coupled to antennas if the loads presented by the antennas are approximately balanced, in which case antennas 802 and 804 are electrically isolated, can float electrically relative to each other and to the other circuits on the IC, and can develop different potentials across them.

Rectifiers 816 and 820 rectify electromagnetic energy incident on the antennas to power tag circuits 814. IC 800 also includes modulator/demodulators 818 and 822, each of which may be similar to modulator 446 and demodulator 442 shown in FIG. 4. Tag circuits 814 are typically coupled to IC reference potential 832, which is illustrated as "ground" for convenience but which does not necessarily have any relationship to earth ground and which may, in some embodiments, be coupled to one or another of the antenna ports.

In IC 800 modulator/demodulator 818 is coupled to antenna 802 via port 1, and modulator/demodulator 822 is coupled to antenna 804 via port 2. If antennas 802 and 804 are configured to operate at different frequencies, in different frequency ranges, or using different electromagnetic regimes, then the modulator/demodulator associated with each antenna may be likewise configured or optimized to operate at the corresponding frequency, frequency range, or electromagnetic regime. In some embodiments, instead of each antenna being coupled to a different modulator and/or demodulator, multiple antennas may be coupled to a single modulator and/or demodulator. In some embodiments the two antenna ports, and the circuitry attached to them, are configured to operate simultaneously.

Tag antennas according to embodiments may assume any form and are not limited to dipoles. For example, a tag antenna may be a patch, slot, dipole, loop, coil, horn, spiral, or any other suitable antenna. Furthermore, according to embodiments, coupling capacitors, if any, may be located on or off the IC, may have suitable capacitance values, and may be selected based on parameters such as substrate type, fabrication methods, antenna type, circuit performance, and other circuit and capacitor characteristics.

Whereas only one dual-differential RFID tag IC is described above in relation to FIG. 8, other configurations, such as but not limited to those described in parent applications U.S. patent application Ser. No. 12/483,842 filed on Jun. 12, 2009 and U.S. patent application Ser. No. 13/196,877 filed on Aug. 2, 2011 (both of which are hereby incorporated by reference in their entireties), are contemplated. Similarly, while only dual-port RFID tag IC configurations are used in the examples described herein, in other embodiments tag ICs with more than two ports may be used.

As described above, in some embodiments IC 800 may be configured to determine the port associated with an incoming signal and provide port-dependent functionality. As one example, circuitry 814 in IC 800 may be configured to measure the received RF power at each of ports 1 and 2, and compare the measured RF power levels to each other and/or to one or more threshold values (such as might be stored in tag memory) to associate a port with a received signal. In some embodiments the comparison may be done by first measuring a difference in received RF power between the two ports and then comparing the measured value to a threshold. In some embodiments circuitry 814 may be configured to favor one port over another.

Figure 9:
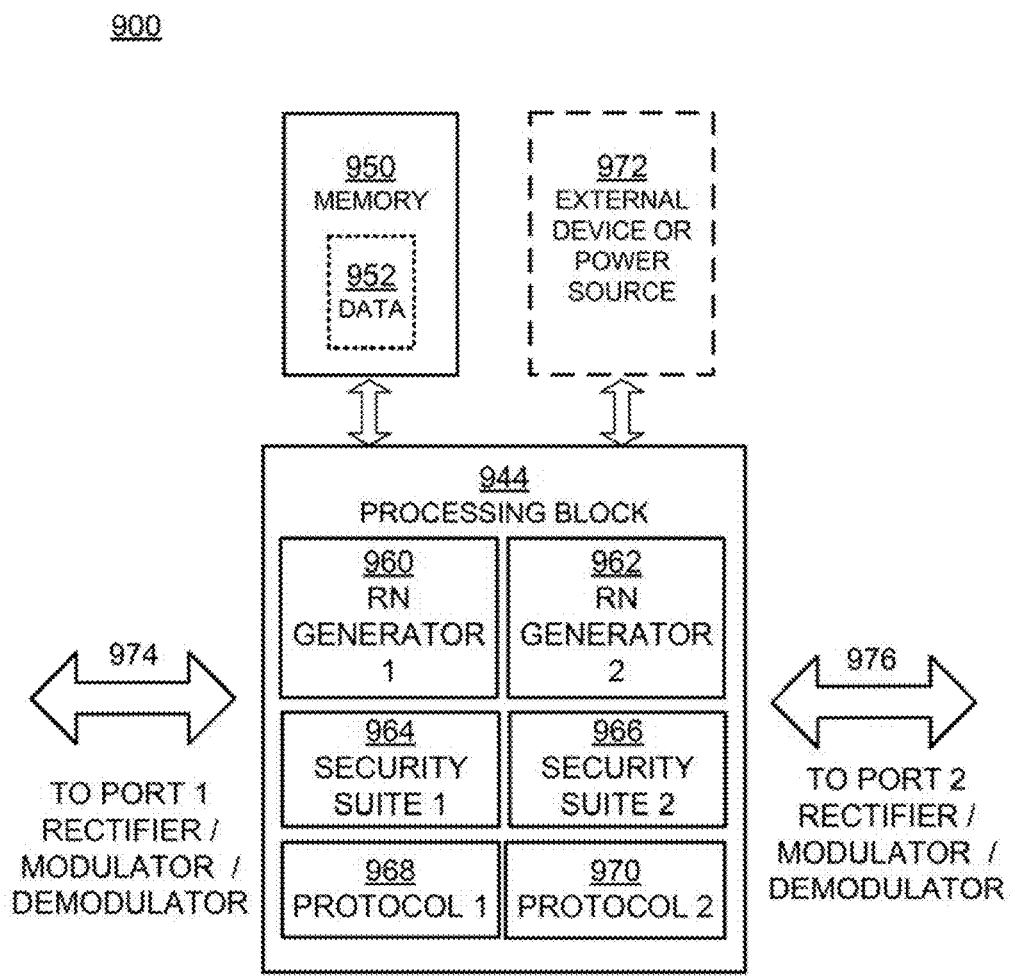
FIG. 9 is a block diagram showing a detail of an RFID tag IC capable of port-dependent functionality according to embodiments.

FIG. 9 is a block diagram 900 showing a detail of a dual-port RFID tag IC. Diagram 900 shows a processing block 944 similar to processing block 444 in FIG. 4; memory 950 (storing data 952) similar to memory 450 in FIG. 4; and an optional external device or power source 972. In some embodiments processing block 944, memory 950, and/or external device or power source 972 may be similar to tag circuitry 814 in FIG. 8. Processing block 944 connects to a rectifier, modulator, and/or demodulator associated with a first port (e.g., modulator/demodulator 818 and/or rectifier 816 associated with port 1 in FIG. 8) via path 974, and connects to a rectifier, modulator, and/or demodulator associated with a second port (e.g., modulator/demodulator 822 and/or rectifier 820 associated with port 2 in FIG. 8) via path 976.

As described above, in some embodiments a multi-port RFID IC may be configured to provide port-dependent functionality. That is, the way the IC processes an incoming or outgoing signal may depend on the port on which the signal is received or sent. For example, processing block 944 may include a first random-number (RN) generator (RNG) 960 and a second RNG 962. When a signal received or sent via path 974 (to port 1) requires an RN, processing block 944 may use first RNG 960 to generate the RN. Similarly, when a signal received or sent via path 976 (to port 2) requires an RN, processing block 944 may instead use second RNG 962. The first and second RNGs may differ in the way they generate RNs and/or in the length of the RNs they generate. For example, the first RNG may generate relatively long RNs, and the second RNG may generate relatively short RNs. If near-field transactions are of a sensitive nature (e.g., involve financial or secret information) and far-field transactions are less sensitive, then processing block 944 may use the first RNG for processing transactions received from a port connected to a near-field antenna and the second RNG for processing transactions received from another port connected to a far-field antenna.

In some embodiments, processing block 944 may use a first security suite 964 and/or a first protocol 968 for signals associated with port 1, and a second security suite 966 and/or a second protocol 970 for signals associated with port 2. The first security suite 964 may differ from the second security suite 966 in its encryption algorithm, secret key, session keys, or any other parameter associated with a security suite. The first protocol 968 may differ from the second protocol 970 in its commands, responses, symbols, framing, data rates, or any other parameter associated with a communications protocol.

In some embodiments, access to memory 950 (or to data 952) and/or to the optional external device/power source 972 may vary by port. For example, an RFID IC may deny a request to read data 952 from one port but may grant the same request received from another port. In some embodiments, access to a portion of memory 950 (or to data 952) may be restricted (or granted). For example, an RFID IC may respond to a reader's request to read data 952 from one port with only a portion of data 952, whereas it may respond to a request to read data 952 from another port with a different portion or the entire data 952. Similarly, the processing block 944 of an RFID IC may deny a request from one port to access external device/power source 972, whereas it may grant it from another port.

In some embodiments an RFID IC may be hosted by (coupled to or embedded in) an electronic device, such as being coupled to a microprocessor or embedded in a television, and may provide a host-device functionality that varies with the incoming RF signal port. For example, an RFID IC may route a received signal to a microprocessor if it receives the signal on a near-field antenna port but not route the signal if it receives the signal on a far-field port. As another example, an RFID IC may give a reader access to a memory of a television if it receives the access request on a near-field antenna port but deny the request if it receives the request on a far-field antenna port. As yet another example, an RFID IC may configure the operating language of a television if it receives the configuration request on a far-field antenna port but not if it receives the configuration request on a near-field antenna port. Of course, the choice of near- and far-field is application-dependent, and could be swapped in these examples. Similarly, the port choice could be based on other parameters of the incoming signal, such as the signal's frequency, protocol, strength, encoding, etc.

In some embodiments, a port-dependent functionality may be configured via one or more configuration bits. FIGS. 10A-E show reader interactions with an RFID IC 1004 that has configurable port-dependent functionality according to embodiments. In each of FIGS. 10A-E, RFID IC 1004 is shown connected to a far-field antenna 1006 on one port and to a near-field antenna 1008 on another port, although it should be obvious from the preceding discussion that any antenna configuration may be used. Configuration bits 1010, which may be stored in IC 1004 or provided to IC 1004 by a reader, control the port functionality. By typical convention, if a configuration bit has a value "1" then the functionality controlled by that bit is operable, and if the value is "0" then the functionality is inoperable. Of course, any bit value can be used, including more than one bit or word or value or physical parameter to indicate a port's functionality.

In some embodiments a bitstring may indicate whether a port functionality is operable, or to select from a number of different port configurations.

In FIGS. 10A-E, each port has four configuration bits to control four functionalities. In other embodiments more or fewer configuration bits may be used to control more or fewer functionalities.

In the embodiments of FIGS. 10A-E the "Enable" ("Port Enable") bit determines whether a port is active and may partially or completely switch a port on or off. The "EPC" ("EPC Select") bit may determine the electronic product code (EPC) or portion of an EPC that a tag transmits in response to a request received on that port. The "Crypto" ("Crypto Enable") bit may determine whether an incoming signal on a port, if active, will be allowed to access memory and/or to execute secure/cryptographic tag functionality such as a tag authentication, reader authentication, mutual authentication, hash or message-authentication-code computation or verification, or other cryptographic operations as are known to those skilled in the art. Finally, the "Jam" ("Jamming Enable") bit may determine if an associated port will transmit a jamming signal when another port is transmitting data. Such functionality may be useful, for example, to mask the transmitted data from an unauthorized interrogator.

Each of the functionalities may be as simple or may include as many capabilities as required by the application. For example, referring to the EPC bits, an EPC bit value of "0" may mean that the tag's reply to an EPC request received on port 1 includes a first EPC, whereas an EPC bit value of "1" may mean that the reply includes a second EPC different from the first. In some embodiments it may be desirable to only transmit a portion of an EPC, such as for security purposes, in which case an EPC bit value of "0" may mean that the reply to an EPC request includes only a portion of an EPC, whereas an EPC bit value of "1" may mean that the reply includes a larger portion of the EPC, or vice-versa. In other embodiments other select bits may control functionalities associated with other codes or identifiers, such as a tag identifier (TID), stock-keeping unit (SKU), universal product code (UPC), serialized global trade identification number (SGTIN), or any other suitable code or identifier. As with the EPC bit, a select bit with a first value may mean that the reply to a code request includes a first code or only a portion of a code, whereas a select bit with a second value may mean that the reply to the request includes a second code or a larger portion of a code.

Figure 10A:
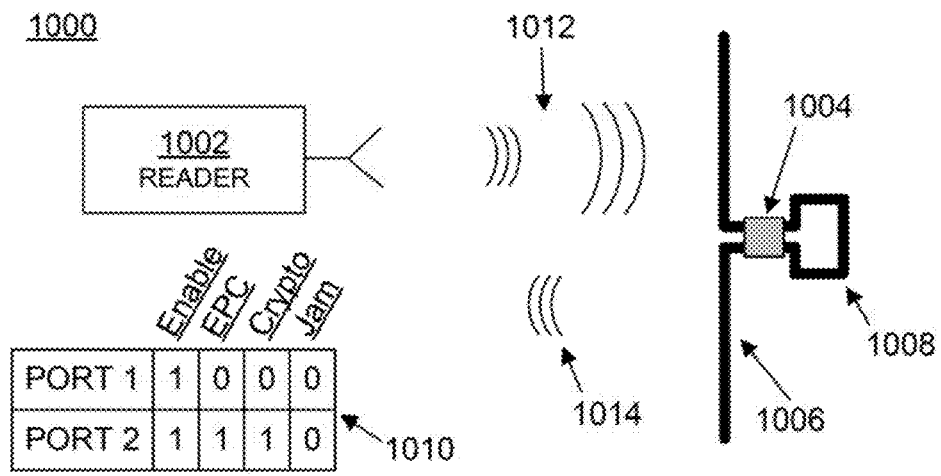
FIGS. 10A-E depict reader interactions with an RFID tag IC capable of port-dependent functionality according to embodiments.

FIG. 10A depicts a scenario 1000 in which a reader 1002 transmits tar-field signals 1012 to a multi-port RFID IC 1004 connected to a far-field antenna 1006 on port 1 and a near-field antenna 1008 on port 2. The port 1 configuration bits are set to "1000" meaning that port 1 is enabled, IC 1004 will transmit a first EPC in response to a request on port 1, cryptographic functionality on port 1 is disabled, and jamming on port 1 is disabled. If reader 1002 requests an EPC via far-field signal 1012 and tag IC 1004 receives signal 1012 on port 1 then IC 1004 replies with the first EPC. However, if reader 1002 attempts to access memory or execute a secure command using far-field signal 1012 then tag 1004 may ignore or deny the request. The configuration bit values in scenario 1000 are desirable in situations where RFID tag IC 1004 will identify itself in response to both far-field and near-field signals, but will restrict the ability of a distant reader (using far-field signals) to access memory or private information stored on the tag IC.

Figure 10B:
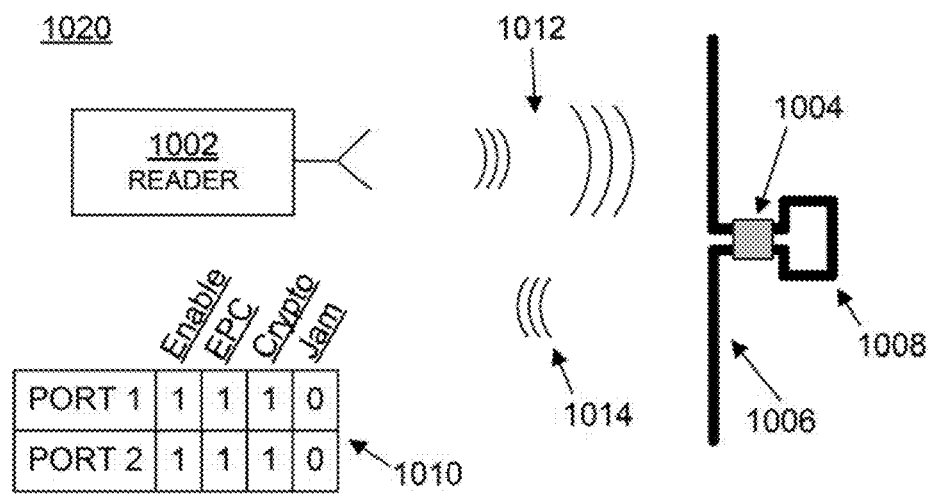

FIG. 10B depicts a scenario 1020 similar to scenario 1000 in FIG. 10A. However, in scenario 1020 the port 1 configuration bits are set to "1110" meaning that port 1 is enabled, IC 1004 will transmit a second EPC in response to a request on port 1, cryptographic functionality is enabled so a distant reader (using far-field signals) may access memory and/or execute secure commands, and jamming on port 1 is disabled. If reader 1002 requests an EPC via far-field signal 1012 and tag IC 1004 receives signal 1012 on port 1 (coupled to far-field antenna 1006) then IC 1004 replies with a second EPC that may be diferent, longer than, or more complete than the first EPC (which the tag would transmit if the EPC bit value were "0").

Figure 10C:
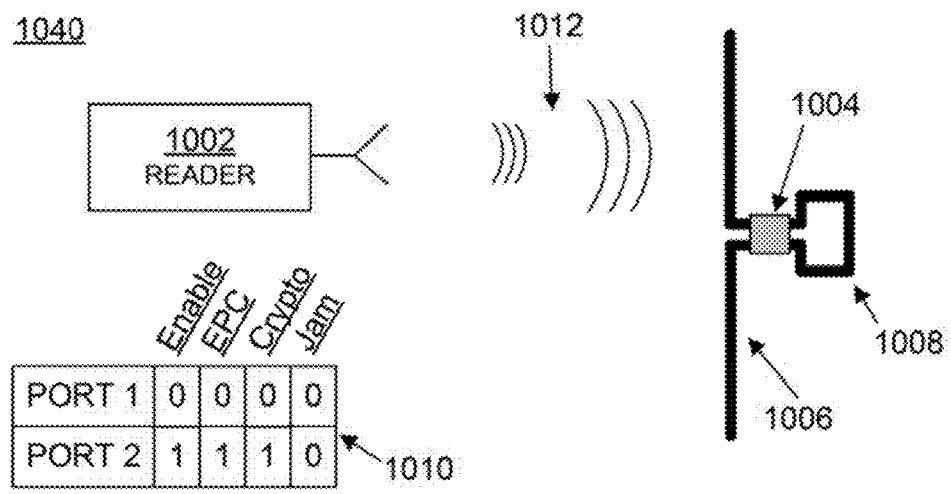

FIG. 10C depicts a scenario 1040 in which tag IC 1004 is configured to ignore far-field signals. In scenario 1040, the port 1 Enable bit is set to "0". If reader 1002 transmits a far-field signal 1012 then tag IC 1004 does not respond. In some embodiments, tag IC 1004 may disconnect itself from far-field antenna 1006, in effect not receiving signal 1012 at all. In other embodiments tag IC 1004 may remain coupled to far-field antenna 1006 but ignore or deny the incoming signal 1012 or the data contained in it. For example, tag IC 1004 may be configured such that a rectifier associated with port 1 (e.g., rectifier 816 in FIG. 8) remains operable to harvest power from incoming signal 1012, but a demodulator associated with port 1 (e.g., modulator/demodulator 818 in FIG. 8) remains inactive or is disconnected, thereby preventing information decoding from signal 1012. Optionally, the demodulator may remain active and decode incoming data, but tag IC 1004 may be configured to ignore the incoming data.

Figure 10D:
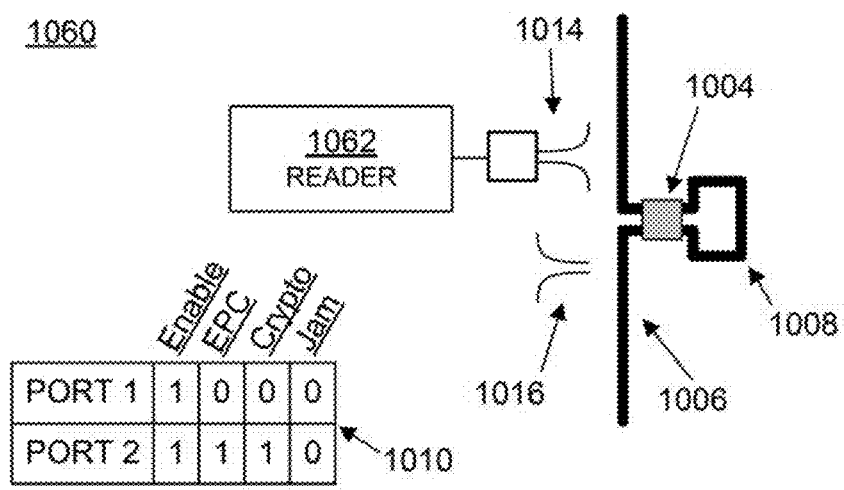

FIG. 10D depicts a scenario 1060 in which a reader 1062 transmits a near-field signal 1014 to tag IC 1004, which is connected to a near-field antenna 1008 on port 2. According to configuration bits 1010, port 2 is enabled (Enable bit is "1"); IC 1004 will respond to an EPC request on port 2 by sending a second EPC (EPC bit is "1"); incoming near-field signals on port 2 may be allowed to access secure memory and/or execute secure commands (Crypto bit is "1"); and jamming is disabled (Jam bits for ports 1 and 2 are both "0").

Figure 10E:
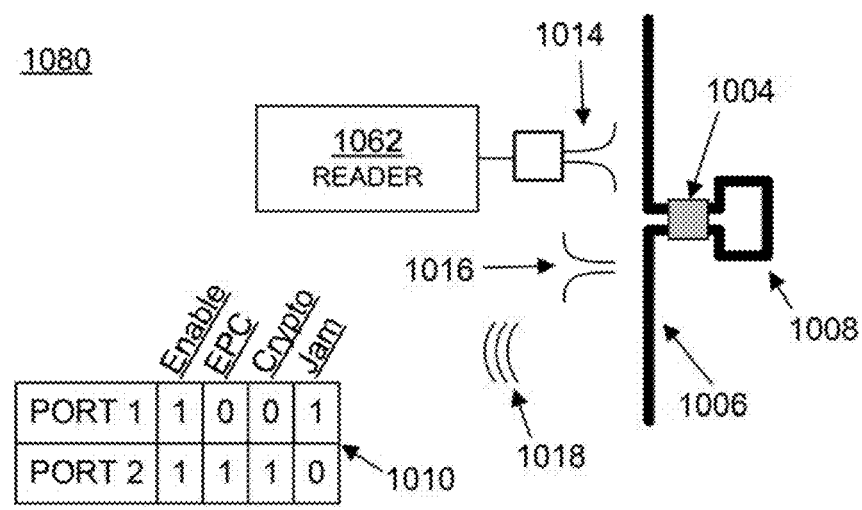

FIG. 10E depicts a scenario 1080 in which jamming functionality is enabled on one port of tag IC 1004. Scenario 1080 is similar to scenario 1060 in FIG. 10D, where IC 1004 is configured to respond to a near-field signal 1014 from reader 1062. However, unlike scenario 1060, in scenario 1080 tag IC 1004 is configured to transmit a jamming signal 1018 on port 1 (port 1 Jam bit is "1") while also transmitting a near-field reply 1016, to obscure information contained in reply 1016. In some embodiments the jamming signal and/or the reply signal may be far-field, in some near-field, and in some a mix of far- and near-field. In yet other embodiments jamming signal 1018 may be transmitted when no reply 1016 is transmitted. Jamming signal 1018 may be or include a random signal, a noise signal, or any other signal suitable for preventing an eavesdropper from receiving and/or decoding reply 1016.

As described above, a tag IC may be configured to determine the port associated with an incoming signal by, for example, measuring the RF power received at the port. In some embodiments a tag may use measured RF power to determine if the tag, the tag's IC, and/or an item associated with (e.g., attached to) the tag has been tampered with. For example, a tag IC may measure the difference in RF power between two ports, whose difference may be due to, among other things, some characteristic of the tag, its antennas, or an associated item. A change in this difference may be due to some modification of the tag, its antennas, and/or the associated item, and may indicate that the tag, its antennas, and/or the associated item have been tampered with. In some embodiments, the tag IC may also (or instead) measure the difference in received RF power on the same port at different times to detect changes.

Figure 11A:
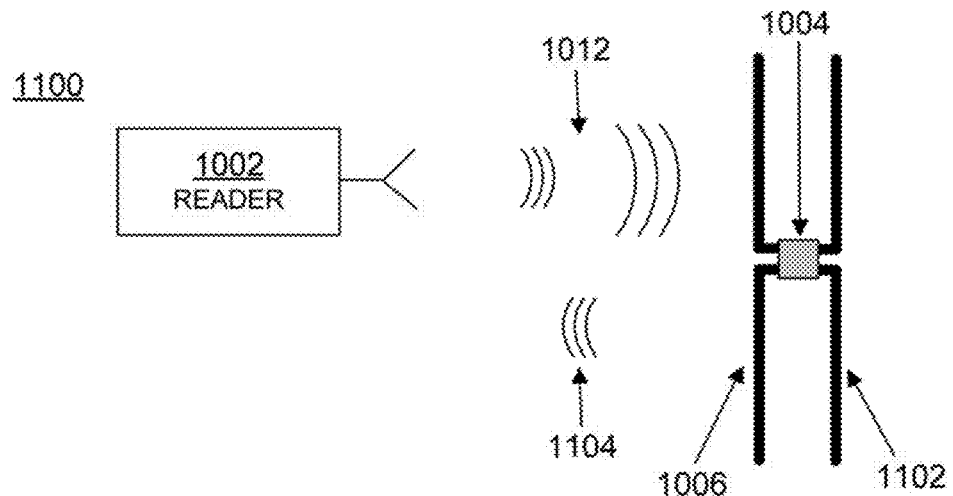
FIGS. 11A-B depict other reader interactions with an RFID tag IC capable of port-dependent functionality according to embodiments.

FIG. 11A depicts a scenario in which tag IC 1004 has two antennas 1006 and 1102 coupled to ports 1 and 2, respectively. IC 1004 may use port 1 to communicate with reader 1002, and may use port 2 to detect tampering or other differences in the electromagnetic environment of antennas 1006 and 1102. In other embodiments, tag IC 1004 may use port 2 instead of port 1 to communicate, or may use both ports and antennas to communicate while also detecting tampering. When IC 1004 detects an incoming signal 1012 from reader 1002, it may determine the difference in signal power between ports 1 and 2 and, if the difference is or closely approximates an expected difference (which may be preprogrammed into IC 1004 or determined in some other way) then IC 1004 may transmit a first code in its reply 1104. If, on the other hand, the difference is different than the expected difference then IC 1004 may transmit a second code in its reply 1104. The difference in the codes may allow reader 1002 to determine if the tag, IC, or associated item has been tampered with. In some embodiments, ports 1 and/or 2 may include or be coupled to a wire loop, sticker, dielectric material, metallic thread, conductive thread, and/or any other component suitable for tamper detection.

Figure 11B:
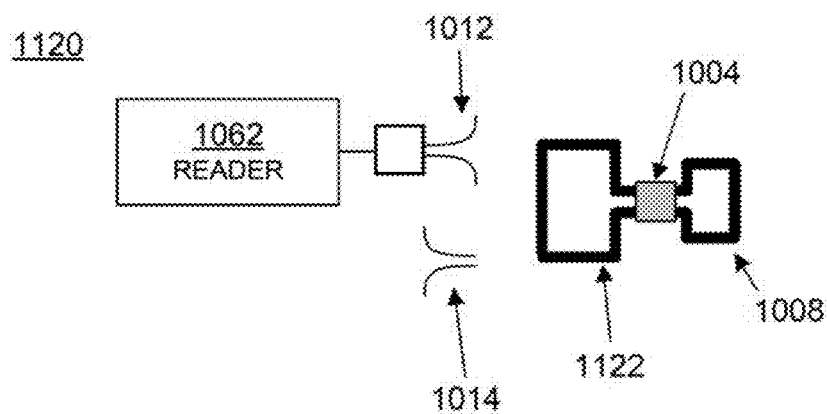

A reader and/or a tag may also use a measured difference in RF power between two tag IC ports to determine other information about the tag and/or the item to which the tag is attached. FIG. 11B depicts a scenario in which slightly different near-field antennas 1008 and 1122 are coupled to two ports of tag IC 1004, and in which tag IC 1004 may use a measured power difference between the two ports to determine the dielectric properties of an attached item. For example, the tag may be attached to a container. If the container is empty then IC 1004 may measure one RF power difference between the two ports, whereas if the container contains a liquid then IC 1004 may measure a second, different RF power difference between the two ports. The reason for the difference is that the liquid changes the dielectric properties of the tag's environment, and because the two antennas 1008 and 1122 differ, the dielectric loading may affect each antenna in a different way, causing a shift in the measured RF power difference. Thus, the fill state of the container (i.e., whether it is empty or full, or the amount of liquid in the container) may be determined by measuring the RF power difference. In other embodiments tag IC 1004 may be configured to detect dielectric property changes due to any other suitable environmental factor (i.e. not just due to liquid fill).

In some embodiments, tuning antennas 1008 and 1122 to different frequencies may allow a reader and/or a tag to determine a region of operation. For example, different regions of the world, such as the United States and the European Union, use different frequencies for RFID. By tuning one antenna to US frequencies and the other to EU frequencies, the reader and/or the tag may determine the region in which tag IC 1004 is operating by measuring the received RF power difference between the antennas. Further embodiments of ICs with antennas tuned to different frequencies or frequency ranges are described in parent U.S. patent application Ser. No. 13/196,877 filed on Aug. 2, 2011, which has been incorporated by reference in its entirety.

Although only four configuration bits are described above, additional configuration bits for controlling other port functionalities are contemplated. As one example, configuration bits 1010 may include a protocol-select field that determines which communication protocol a port uses. As described above a protocol specifies, in part, symbol encodings, modulations, rates, timings, and other parameters. It may specify a communications range, a frequency range (e.g., ultra-high frequency (UHF), high-frequency (HF) or low-frequency (LF)), or an application. In some embodiments IC 1004 may be configured to use one protocol for communication on one port and another for communication on another port.

As another example, configuration bits 1010 may include a power-select bit that sets how a particular port extracts power from an RF field. As described above, passive RFID tags harvest RF radiation incident on their antenna(s). In some embodiments a tag IC may use a power-select bit to configure one port for communications and another port for power harvesting without communications. This configuration may be useful in environments containing RF signals of different frequencies or types. For example, a tag that communicates using UHF RFID may operate in an environment containing other RF radiation (e.g., WiFi or GSM/UMTS/LTE cellular signals). If the RFID tag configures one of its ports to harvest power from the other radiation then it may be able to enhance its operating range.

Figure 12:
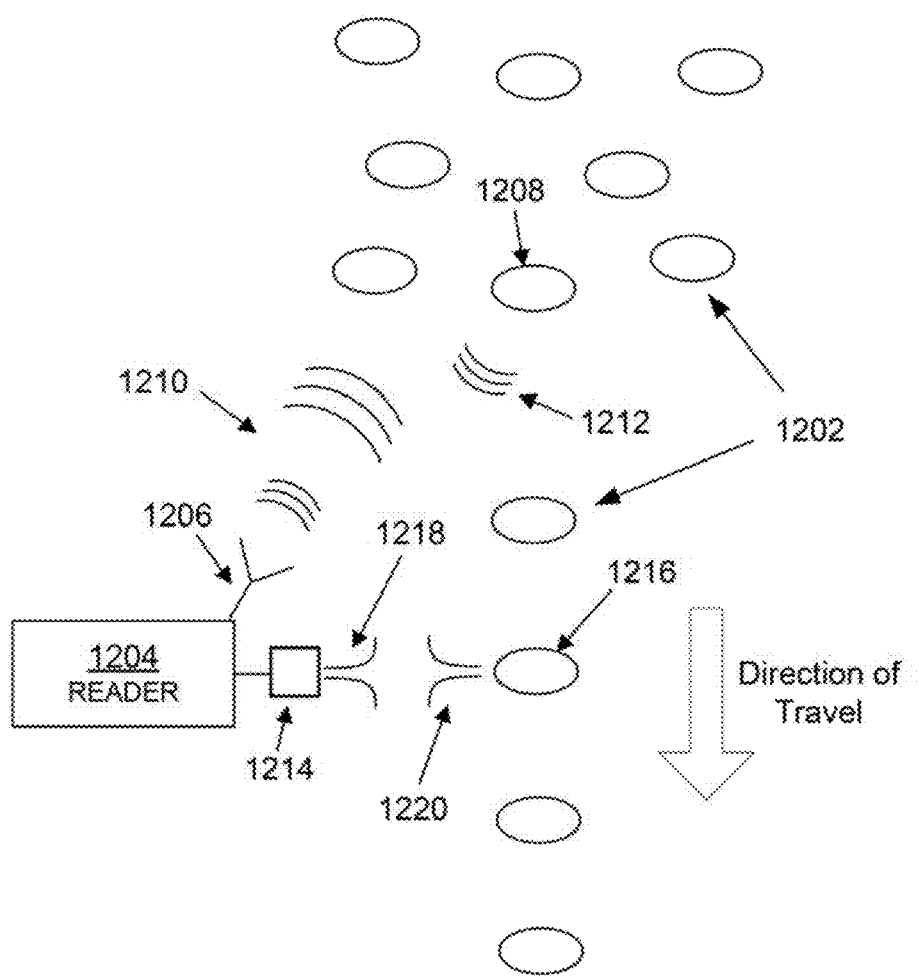
FIG. 12 depicts an example of reader interactions with tags having RFID tag ICs capable of port-dependent functionality according to embodiments.

In some embodiments, tags and readers capable of port-dependent functionality may facilitate tag processing. For example, consider a situation as shown in FIG. 12, in which an RFID reader situated at an access point such as a doorway or entrance reads from or writes to passing tags. In applications containing high tag volumes or fast-moving tags, the reader may not have sufficient time to read from and/or write to a tag. In these situations port-dependent functionality may help by (a) configuring tags to reply to a far-field signal with a long code and a near-field signal with a short code, and/or (b) configuring tags to perform time-intensive tasks while the tag is in the far field, before the tag has entered near-field range.

Diagram 1200 in FIG. 12 includes RFID tags 1202 and an RFID reader 1204. Tags 1202 may be attached to items, associated with people, or used in any other way known in the art. At least some of the tags 1202 support port-dependent functionality in which the tag IC may be coupled to a near-field antenna on one port and a far-field antenna on another port. Reader 1204 is likewise coupled to a near-field antenna 1214 and a far-field antenna 1206, and may be situated near an access point so it can communicate with tags passing through the access point using near-field signals and with other, more distant tags not passing through the access point using far-field signals. In some embodiments reader 1204 may be configured to simultaneously communicate using both far-field antenna 1206 and near-field antenna 1214, or may be configured to communicate through only one antenna at a time. Some of the tags 1202 (such as tag 1208) may be relatively far from reader 1204 and only able to communicate with reader 1204 via far-field signals, whereas another portion of the tags 1202 (such as tag 1216) may be closer to reader 1204 and may communicate with it via near-field signals.

A tag that has not yet passed through the access point (e.g. tag 1208) may first receive a far-field signal 1210 from reader 1204. Tag 1208 may send a reply 1212 based, at least in part, on one or more configuration bits for the port on which it received signal 1210. As one example, tag 1208 may be configured to reply with a first identifier upon receiving a request on a port with a tar-field antenna. Tag 1208 may also (or instead) be configured to compute a response and store the computed response for later retrieval.

Subsequently, tag 1208 may pass through the access point and engage in one or more near-field interactions with reader 1204. As described above, such interactions may be time-limited due to range limitations and tag speed, so they should be quick. Consider tag 1216 which is ahead of tag 1208, passing through the access point in the indicated direction of travel, and which receives a near-field signal 1218 from reader 1204. Tag 1216 may send a reply 1220 based on signal 1218 and/or one or more configuration bits associated with the port on which it receives signal 1218. Tag 1216 may be configured to reply to the near-field signal with a short identifier, a truncated identifier, or with a response that was precomputed as a result of a prior, far-field reader interaction. Because reader 1204 may have previously communicated with tag 1216 (e.g., when it was located where tag 1208 is now), reader 1204 may already know tag 1216's identifier and therefore only needs it to reply with a portion of its identifier to confirm the tag's identity or with its precomputed response to finish the prior dialog. In some embodiments, reader 1204 may perform any time-consuming network interactions (such as key retrieval) needed to continue a dialog with a tag after the far-field interaction but prior to the near-field dialog, accelerating the interaction. In some embodiments reader 1204 may use reply 1220 to authenticate tag 1216.

Whereas tag ICs replying with a long code in response to a far-field signal and with a short code in response to a near-field signal, or initiating computation of a response upon receiving a far-field signal and sending the response upon receiving a near-field signal, has been described in the context of facilitating tag movement through an access point, such functionality is not so limited. Tags may be configured to respond to far-field and near-field signals differently in any situation and in any application as required by the particular use case. As another example, tags may be configured to perform portions of a cryptographically secured interaction in response to far-field signals, but transmit data associated with the interaction only in response to near-field signals.

In some embodiments, a tag IC may use different passwords or cryptographic keys to perform an authentication (tag, reader, or mutual authentication) depending on which port the tag IC is using to communicate with a reader.

In some embodiments, a tag's reply may include one or more port-indicator bits that indicate the port on which a signal was received and/or from which the tag reply was sent. For example, if a tag receives a signal on port 1 and sends its reply on port 1 then the reply may include a port-indicator value of "00", whereas if it receives a signal on port 1 and sends its reply on port 2 then it may include a port-indicator value of "01". In some embodiments a reader signal may include a bit indicating the type of signal it is (far- or near-field).

In some embodiments a port-indicator bit may indicate to a tag or reader whether a signal is proper or improper. For example, suppose a near-field reader signal incident on a nearby tag's far-field antenna is resonantly propagated to other tags in the far field that are not supposed to receive the signal or are not supposed to receive it on a far-field antenna. In such a situation, having the reader signal or a tag reply include an indicator bit allows the reader and/or a tag to determine whether the signal is proper or improper.

Figure 13:
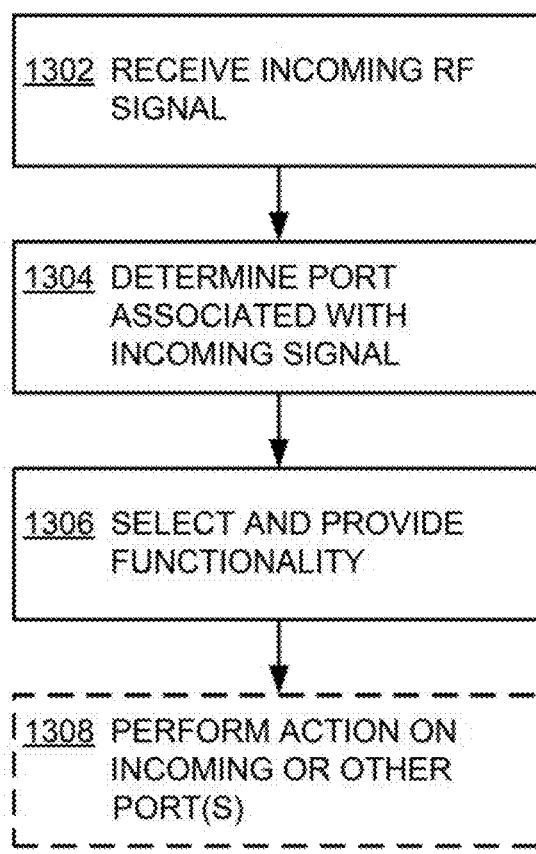
FIG. 13 is a flowchart depicting a process for determining functionality based on an incoming signal port according to embodiments.

FIG. 13 is a flowchart depicting a process 1300 for determining a functionality based on an incoming signal port according to embodiments. Process 1300 may be performed by a tag IC or a tag-IC processing block such as those described above. In step 1302 the incoming RF signal, such as a reader command, is received. In step 1304 the port associated with the incoming signal is determined. In some embodiments the port is determined by measuring the RF power received on the port and comparing the measured value to that on another port and/or to one or more threshold values. In step 1306 one or more functionalities associated with at least the port, and optionally also with one or more attributes of the incoming signal, are selected and provided. The functionality may be a security suite, a random number, a random-number generator, a protocol, a frequency, a reply or lack thereof, enabling or disabling a port, a reply port, a privilege, a memory access, a data bit or word, a functionality of the item to which the tag is attached, an authentication, a memory access of the item to which the tag is attached, or any other functionality used in or useful for RFID information processing or communications. In optional step 1308 an action may be performed on the incoming or on another port, for example transmitting a jamming signal.

Embodiments may also include methods of manufacturing a tag as described herein. These methods may be performed in conjunction with one or more human operators. These human operators need not be collocated with each other, and each can be with a machine that performs a portion of the manufacturing.

Embodiments for manufacturing a tag as described herein may additionally include programs, and methods of operating the programs. A program is generally defined as a group of steps or instructions leading to a desired result, due to the nature of the elements in the steps and their sequence.

Executing a program's steps or instructions requires manipulating physical quantities that represent information. These quantities may be electrical, magnetic, and electromagnetic charges or particles, states of matter, and in the more general case the states of any physical elements. These quantities are often transferred, combined, compared, and processed according to the steps or instructions. It is convenient at times to refer to the information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Executing a program's steps or instructions may further require storage media that have stored thereon a program's instructions and/or data, typically in a machine-readable form. This storage media is typically termed a memory, read by a processor or other machine element. In electronic devices the memory may be implemented as Read Only Memory (ROM), Random Access Memory (RAM), and many others as will be well known to those skilled in the art. In some embodiments the memory may be volatile and in others nonvolatile.

Even though it is said that a program is stored in a memory, it should be clear to a person skilled in the art that the program need not reside in a single memory, or even be executed by a single machine. Various portions, modules, data, or features of the program may reside in separate memories and be executed by separate machines.

Often, for sake of convenience, it is desirable to implement and describe a program for manufacturing a tag according to embodiments as software. The software can be unitary or can be considered as various interconnected software modules.

Embodiments of an RFID tag or of a program for manufacturing an RFID tag as described herein can be implemented as hardware, software, firmware, or any combination thereof. It is advantageous to consider such a tag as subdivided into components or modules. A person skilled in the art will recognize that some of these components or modules can be implemented as hardware, some as software, some as firmware, and some as a combination.

The above specification, examples, and data provide a complete description of the composition, manufacture, and use of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

The invention claimed is:

1. A Radio Frequency Identification integrated circuit (IC), comprising:
   a first antenna port configured to be coupled to a first antenna;
   a second antenna port configured to be coupled to a second antenna functionally distinct from the first antenna, wherein the first antenna port is electrically isolated from the second antenna port such that the antenna ports do not share a same reference potential; and
   a processing block configured to:
      receive concurrent inputs from the first antenna port and from the second antenna port;
      determine whether a first input is properly received from the first antenna port based on a value of one or more port-indicator bits associated with the first input, wherein
         the one or more port-indicator bits identify a type of a signal from a reader to the IC,
         a first value of the port-indicator bits indicate that the signal is received from and sent by the same antenna port, and
         a second value of the port-indicator bits indicate that the signal is received from and sent by different antenna ports;
      in response to the determination that the first input is properly received from the first antenna port, operate with a first IC functionality;
      determine whether a second input is properly received from the second antenna port based on the value of the one or more port-indicator bits associated with the second input; and
      in response to the determination that the second input is properly received from the second antenna port, operate with a second IC functionality different from the first IC functionality.

2. The IC of claim 1, wherein the first antenna port is connected to a far-field antenna and the second antenna port is connected to a near-field antenna.

3. The IC of claim 1, wherein the processing block is further configured to determine that the first input was received from the first antenna port and the second input was received from the second antenna port by at least one of:
   comparing a first power received at the first antenna port with a second power received at the second antenna port;
   determining a difference between the first power and the second power; and
   comparing at least one of the first power, the second power, and the difference to a threshold.

4. The IC of claim 1, wherein the processing block is further configured to detect at least one of a dielectric property of an item associated with the IC and whether the item has been tampered with by comparing the first input to at least one of:
   an input previously received from the first antenna port, the second input, and
   a threshold.

5. The IC of claim 1, wherein the processing block is configured to operate with the first IC functionality by at least one of:
   providing a jamming signal;
   receiving RF power;
   using a first frequency for communicating with a reader;
   using a first protocol for communicating with the reader;
   using a first security suite;
   performing an authentication;
   using a first password;
   using a first cryptographic key;
   using a first random number generator;
   enabling at least one of the antenna ports;
   disabling at least one of the antenna ports;
   providing a first random number to the reader;
   providing one of a first code and a second code to the reader;
   determining whether to reply to the reader; and
   determining which of the antenna ports to use for replying to the reader.

6. The IC of claim 1, wherein the processing block is further configured to modify access, based on at least one of the first input and the second input, to at least one of:
   a portion of memory of the IC;
   at least one of the antenna ports;
   a sensor;
   an external power source;
   an external power sink;
   an external data connection to a processing block of an item associated with the IC;
   a portion of memory of the item; and
   a functionality of the item.

7. The IC of claim 1, further comprising a memory storing at least one configuration bit defining at least one functionality associated with at least one of the antenna ports.

8. The IC of claim 1, further comprising a memory, wherein the processing block is further configured to:
   receive a first reader command from the first antenna port;
   store a response to the first reader command in the memory; and
   reply to a second reader command from the second antenna port with the stored response.

9. A method for a Radio Frequency Identification integrated circuit (IC) having a first antenna port and a second antenna port, wherein the first antenna port is configured to be coupled to a first antenna, the second antenna port is configured to be coupled to a second antenna functionally distinct from the first antenna, and the first antenna port is electrically isolated from the second antenna port such that the antenna ports do not share a same reference potential, the method comprising:
   receiving concurrent inputs from the first antenna port and from the second antenna port;
   determining whether a first input is properly received from the first antenna port based on a value of one or more port-indicator bits associated with the first input, wherein
      the one or more port-indicator bits identify a type of a signal from a reader to the IC, a first value of the port-indicator bits indicate that the signal is received from and sent by the same antenna port, and a second value of the port-indicator bits indicate that the signal is received from and sent by different antenna ports;

in response to determining that the first input is properly received from the first antenna port, operating with a first IC functionality;

determining whether a second input is properly received from the second antenna port based on the value of the one or more port-indicator bits associated with the second input; and in response to determining that the second input is properly received from the second antenna port, operating with a second IC functionality different from the first IC functionality.

10. The method of claim 9, further comprising determining that the first input was received from the first antenna port and the second input was received from the second antenna port by at least one of:

comparing a first power received at the first antenna port with a second power received at the second antenna port;

determining a difference between the first power and the second power; and comparing at least one of the first power, the second power, and the difference to a threshold.

11. The method of claim 9, further comprising detecting a property of an item associated with the IC by comparing the first input to at least one of:

an input previously received from the first antenna port, the second input, and
a threshold.

12. The method of claim 11, wherein the property is at least one of:

a dielectric property of the item, and
whether the item has been tampered with.

13. The method of claim 9, wherein operating with the first IC functionality includes at least one of:

providing a jamming signal;
receiving RF power;
using a first frequency for communicating with a reader;
using a first protocol for communicating with the reader;
using a first security suite;
performing an authentication;
using a first password;
using a first cryptographic key;
using a first random number generator;
enabling at least one of the antenna ports;
disabling at least one of the antenna ports;
providing a first random number to the reader;
providing one of a first code and a second code to the reader;
determining whether to reply to the reader; and
determining which of the antenna ports to use for replying to the reader.

14. The method of claim 9, further comprising modifying access, based on at least one of the first input and the second input, to at least one of:

a portion of memory of the IC;
at least one of the antenna ports;
a sensor;
an external power source;
an external power sink;
an external data connection to a processing block of an item associated with the IC;
a portion of memory of the item; and
a functionality of the item.

15. The method of claim 9, further comprising storing at least one configuration bit defining at least one functionality associated with at least one of the antenna ports.

16. The method of claim 9, further comprising:

receiving a first reader command from the first antenna port;
storing a response to the first reader command in a memory; and
replying to a second reader command from the second antenna port with the stored response.

17. A Radio Frequency Identification integrated circuit (IC), comprising:

a first antenna port configured to be coupled to a first antenna;

a second antenna port configured to be coupled to a second antenna distinct from the first antenna, wherein the first antenna port is electrically isolated from the second antenna port such that the antenna ports do not share a same reference potential; and a processing block configured to:

receive concurrent inputs from the first antenna port and from the second antenna port;

determine whether a first input is properly received from the first antenna port based on a value of one or more port-indicator bits associated with the first input, wherein the one or more port-indicator bits identify a type of a signal from a reader to the IC, a first value of the port-indicator bits indicate that the signal is received from and sent by the same antenna port, and a second value of the port-indicator bits indicate that the signal is received from and sent by different antenna ports;

in response to the determination that the first input is properly received from the first antenna port, operate with a first IC functionality;

determine whether a second input is properly received from the second antenna port based on the value of the one or more port-indicator bits associated with the second input; and in response to the determination that the second input is properly received from the second antenna port, operate with a second IC functionality different from the first IC functionality.

18. The IC of claim 17, wherein the first and second antennas are physically distinct.

* * * * *

UNITED STATES PATENT AND TRADEMARK OFFICE
CERTIFICATE OF CORRECTION

PATENT NO. : 10,204,246 B1
APPLICATION NO. : 15/238823
DATED : February 12, 2019
INVENTOR(S) : Maguire et al.

Page 1 of 1

It is certified that error appears in the above-identified patent and that said Letters Patent is hereby corrected as shown below:

In the Specification

In Column 3, Line 54, After "signals)" insert -- . --.
In Column 7, Line 49, Delete "61" and insert -- 6B --, therefor.
In Column 11, Line 49, Delete "tar" and insert -- far --, therefor.
In Column 12, Line 9, Delete "diferent," and insert -- different, --, therefor.
In Column 14, Line 63, Delete "tar" and insert -- far --, therefor.

Signed and Sealed this
Seventh Day of May, 2019

Andrei Iancu
*Director of the United States Patent and Trademark Office*